(No Model.)
C. L. AMES.
VEHICLE WHEEL.
No. 521,692. Patented June 19, 1894.
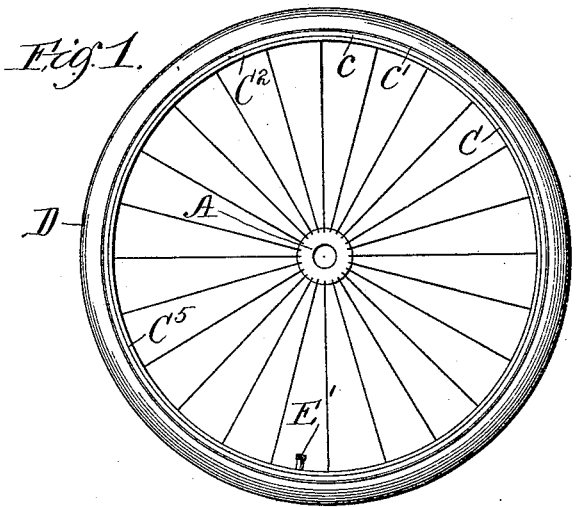
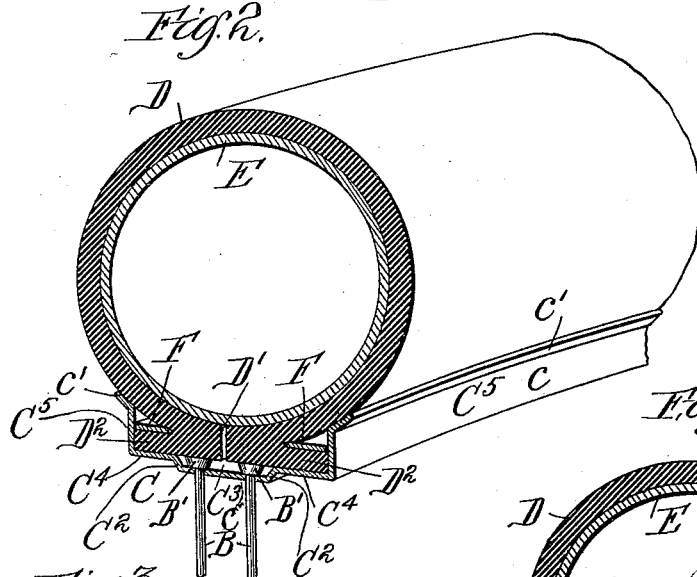
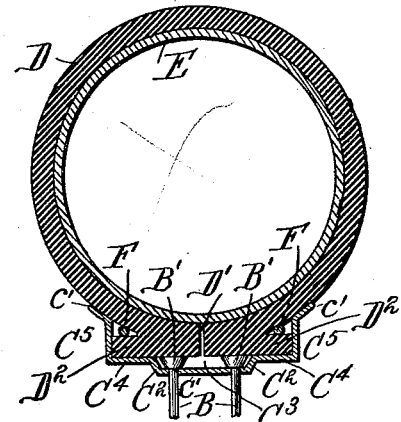
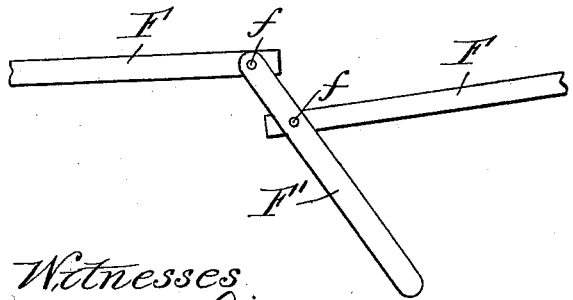
Witnesses
Alice Limee
Ambrose Risdon
Inventor
Charles L. Ames
by Cyrus Kehr Atty

UNITED STATES PATENT OFFICE.

CHARLES L. AMES, OF OAK PARK, ILLINOIS.

VEHICLE-WHEEL.

SPECIFICATION forming part of Letters Patent No. 521,692, dated June 19, 1894.

Application filed November 28, 1893. Serial No. 492,214. (No model.)

*To all whom it may concern:*

Be it known that I, CHARLES L. AMES, a citizen of the United States, residing at Oak Park, in the county of Cook and State of Illinois, have invented certain new and useful Improvements in Vehicle-Wheels; and I do hereby declare the following to be a full, clear, and exact description of the invention, such as will enable others skilled in the art to which it appertains to make the same, reference being had to the accompanying drawings, and to letters of reference marked thereon, which form a part of this specification.

My invention relates particularly to that class of vehicle wheels which are provided with pneumatic tires.

One object of the invention is to produce such a wheel having such a tire so arranged and constructed as to cause it to keep its place well on the rim and at the same time permit easy removal and re-attachment when repairs are to be made.

A further object is to produce a construction in which, while the rim and tire are mutually adapted to effect a firm attachment to each other and permit ready separation as above stated, the configuration of the rim will, at the same time, give to the rim the greatest degree of strength, in order that it may be manufactured of the least possible weight.

In the accompanying drawings: Figure 1 is a side elevation of a wheel embodying my improvement. Fig. 2 is a sectional perspective of a portion of the rim and tire. Fig. 3 is a detail view of a device for tightening the binders by means of which the tire is secured to its seat in the rim. Fig. 4 is a cross section of the tire and rim showing wire or cords used for binders.

Referring to the drawings, A is the hub.
B B are the spokes.
C is the rim.
D is the tire.
E is the air tube of the tire.

At the middle of the rim, C, there is a part, $C'$, which is straight in cross section and of sufficient width to form on its side farthest from the hub, A, a seat for the heads, $B'$, of the spokes, B, and is concentric with the axis of the wheel. From each side of the part, $C'$, a part $C^2$ of the rim extends outward from the axis of the wheel a sufficient distance to form a channel, $C^3$, of a depth substantially equal to the height of the heads, $B'$, of the spokes, B. From the part, $C^2$, the rim extends laterally parallel to the axis of the wheel and parallel to the part, $C'$, a sufficient distance to constitute a flat seat for the tongues, $D^2$, of the tire, D. From the margin of the part, $C^4$, the farthest from the middle of the rim, the latter extends outward from the axis of the wheel in a flange, $C^5$, a distance equal to or greater than the aggregate thickness of the tongue, $D^2$, and binder, F.

The tire, D, is tubular in cross-section and is composed of rubber or other suitable flexible material, and has a slot, $D'$, along the seat and laterally directed tongues, $D^2$, at each side of said slot. The tongues, $D^2$, rest on the seats formed by the parts, $C^4$, and preferably abut against the flange, $C^5$.

Between each tongue and the adjacent part of the body of the tire, a binder, F, rests upon the tongue and presses the latter to the seat formed by the part, $C^4$. Said binders may be bands of metal extending around the wheel and provided with suitable means for pressing them to the tongue as indicated in Figs. 2 and 3, or they may be wires or cords, as indicated in Fig. 4.

Fig. 3 shows two ends of a binder, F, joined by hinges, $f$, to the lever, $F'$. It is obvious that the binder will be tightened by swinging the lever, $F'$, to the left until the two ends of the binder and the lever are in line. Other well known means for tightening and releasing the binders may be used. The middle portion of the seat of the tire, D, will extend over the heads, $B'$, of the spokes. The spokes are preferably arranged in two rows, as indicated in Fig. 3.

E is an air tube. This may be of any well known construction and provided with a nipple, $E'$, whereby it may be inflated. The flange, $C^5$, may have a part, $c$, extending from the part, $C^4$, perpendicular to said part, and a part, $c'$, extending obliquely from the part, $c$, away from the middle of the rim and from the axis of the wheel, as indicated in Fig. 2. The part, $c'$, may, however, be omitted. On the other hand all of said flange may extend obliquely from the part, $C^4$, but it must be of sufficient width to extend by the edge of the tongue, D², and the binder, F. I consider it preferable to form this flange as illustrated in Fig. 2, for this construction forms a better stay for the edge of the tongues, D², and the part, c', forms a secondary seat for the body of the tire, D. Furthermore this variety of direction of the rim in cross section gives the rim great strength. The perpendicular part, c, is particularly helpful in strengthening the rim against folding in response to force applied outside of the rim toward the hub. The portions C², also help in this respect.

I claim as my invention—

In a vehicle wheel, the combination with a hub, of a rim having a middle part, C', straight in cross section and parallel to the axis of the wheel, parts, C², at each side of said part, C', extending outward from the axis of the wheel a distance substantially equal to the thickness of the heads of the spokes, parts, C⁴, at the sides of the parts, C², farthest from the middle of the rim and straight in cross section and parallel to the axis of the wheel, and flanges, C⁵, extending away from the axis of the wheel from each part, C⁴, at the margin of the latter farthest from the middle of the rim, a tubular tire, D, slotted along the seat and having at each side of the slot a tongue, D², resting on one of the parts, C⁴, binders, F, resting upon said tongues between the latter and the body of the tire, and spokes, B, extending from said hub through said rim and having their heads, B', resting in the channel, C³, substantially as described.

In testimony whereof I affix my signature, in presence of two witnesses, this 20th day of November, 1893.

CHARLES L. AMES.

Witnesses:
CYRUS KEHR,
AMBROSE RISDON.